(12) United States Patent
Dahan

(10) Patent No.: US 9,509,844 B2
(45) Date of Patent: Nov. 29, 2016

(54) SYSTEM AND METHOD FOR INDEXING AUTOMATED TELEPHONE SYSTEMS

(71) Applicant: FonCloud, Inc., Toronto (CA)

(72) Inventor: Jean-David Dahan, Austin, TX (US)

(73) Assignee: FonCloud, Inc., Toronto (CA)

( * ) Notice: Subject to any disclaimer, the term of this patent is extended or adjusted under 35 U.S.C. 154(b) by 0 days.

(21) Appl. No.: 14/936,342

(22) Filed: Nov. 9, 2015

(65) Prior Publication Data

US 2016/0112564 A1 Apr. 21, 2016

Related U.S. Application Data

(63) Continuation of application No. 14/691,087, filed on Apr. 20, 2015, now Pat. No. 9,215,320, which is a continuation of application No. 11/969,155, filed on Jan. 3, 2008, now Pat. No. 9,031,214.

(60) Provisional application No. 60/883,206, filed on Jan. 3, 2007.

(51) Int. Cl.
| | |
|---|---|
| H04M 3/00 | (2006.01) |
| H04M 1/64 | (2006.01) |
| H04M 5/00 | (2006.01) |
| G06F 17/30 | (2006.01) |
| H04M 3/493 | (2006.01) |
| H04M 3/51 | (2006.01) |
| G10L 15/26 | (2006.01) |
| H04M 3/56 | (2006.01) |
| H04M 11/10 | (2006.01) |

(52) U.S. Cl.
CPC ...... *H04M 3/5166* (2013.01); *G06F 17/30864* (2013.01); *G10L 15/26* (2013.01); *H04M 3/4931* (2013.01); *H04M 3/4938* (2013.01); *H04M 3/568* (2013.01); *H04M 11/10* (2013.01)

(58) Field of Classification Search
CPC ........... H04M 3/4931; H04M 3/4938; H04M 3/493; H04M 3/4936; G06F 17/30; G06F 17/30864
USPC ............. 379/188, 88.17, 242, 88.01, 265.02, 379/88.03, 283; 709/224; 348/14.06
See application file for complete search history.

(56) References Cited

U.S. PATENT DOCUMENTS

| | | |
|---|---|---|
| 6,456,699 B1 | 9/2002 | Burg et al. |
| 6,714,536 B1 | 3/2004 | Dowling |
| 7,466,334 B1 | 12/2008 | Baba |

(Continued)

*Primary Examiner* — Thjuan K Addy
(74) *Attorney, Agent, or Firm* — Carl M. Napolitano; GrayRobinson, P.A.

(57) ABSTRACT

A telephone subnet crawler is used to access automated telephone response systems and index the information, contents and structure contained therein. A database of the information, contents and structure of a plurality of automated telephone response systems is created by the telephone subnet crawler. A user interface provides callers with direct access to the information, contents and structure of the automated telephone response systems contained in the database. Where an automated telephone response system requires user input, the user interface calls the automated telephone response system and navigates to the node requiring user input, provides the user input and displays the results to the user. Where an automated telephone response system connects to an operator, the user interface calls the automated telephone response system, navigates to the node for an operator, and when an operator is detected, calls the user at a user provided callback number.

20 Claims, 8 Drawing Sheets

(56) References Cited

U.S. PATENT DOCUMENTS

| | | |
|---|---|---|
| 2003/0039341 A1 | 2/2003 | Burg et al. |
| 2003/0229446 A1* | 12/2003 | Boscamp ............ G08G 1/0962 701/469 |
| 2004/0122941 A1 | 6/2004 | Creamer et al. |
| 2008/0228488 A1* | 9/2008 | Berkowitz ............ H04L 29/06 704/270 |
| 2012/0089602 A1 | 4/2012 | Oliver et al. |

* cited by examiner

SYSTEM AND METHOD FOR INDEXING AUTOMATED TELEPHONE SYSTEMS

CROSS-REFERENCE TO RELATED APPLICATIONS

This application is a continuation of application Ser. No. 14/691,087, having a filing date of Apr. 20, 2015 which itself is a continuation of application Ser. No. 11/969,155 having a filing date of Jan. 3, 2008, now U.S. Pat. No. 9,031,214, which claims the benefit of U.S. Provisional Application No. 60/883,206 having filing date of Jan. 3, 2007 entitled "Indexing and Automation of Telephone or Computer Networks, IRV's, ACD's, and Other Software or Hardware Systems," the disclosures of which are hereby incorporated by reference in their entirety and all commonly owned.

FIELD OF INVENTION

The present invention generally relates to automated telephone response systems, and in particular to systems and methods for indexing and automatically navigating an automated telephone response system.

BACKGROUND

As is well known in the art, an automated telephone response system is a telephone based communication technology that provides callers with services based upon the callers' responses to various prompts. A product or service provider will typically publish a telephone number and connect the telephone line to a computer system that detects voice and touch tones from an incoming telephone call. The provider then creates a series of messages that are accessed by the caller. The messages typically give menu choices or information that the caller can choose from by either voice response or touching a number on their telephone. Such automated telephone response systems include Interactive Voice Response (IVR) systems, Automatic Call Distributors (ADC), Private Branch Exchanges (PBX), and Voice Over IP (VoIP) systems, to name a few.

Typical services that can be obtained through an automated telephone response system are hours of operation, account information, package tracking or connection to a human operator for more complex services. In the simplest form, the caller will be greeted by a welcome message, and given a choice of services to choose from. In this case, the messages are pre-recorded to provide the specified information. As an example, a regional chain store may welcome the caller to the store call center and then give a choice such as: "For store hours, press or say 1. For a list of store locations, press or say 2." When the caller makes a selection, the automated telephone response system then plays the appropriate message containing the information selected. In some instances, more information may be required from the caller, than just picking an option. For example, a larger national chain store may choose not to give one message that lists all locations, but rather give a message that says: "To find a store near you, press or say 2." Selecting this option would then lead to a message that says: "Please enter or say your 5-digit zip code." When the caller enters their zip code, the automated telephone response system then plays the message giving the location of the nearest store.

Automated telephone response systems can also provide more complex services and give dynamically created messages. While a credit card company, for example, may have pre-recorded messages for their mailing address, or for local branch locations, they will also provide services such as account balance information, payment due date, or the ability to make a payment over the telephone. When a caller wishes to know their account balance, the automated telephone response system may ask for the account number, the caller's name or other identifying information such as a customer PIN number. The automated telephone response system then creates a reply message based upon the balance of the identified account: a message that applies only to the caller's account. This level of interaction requires that the automated telephone response system be integrated with the credit card company's account management system. If, further, the caller wishes to make a payment over the telephone, the automated telephone response system can prompt the user for an account number, a payment amount and a payment date. Here, the automated telephone response system must also be integrated with a banking verification system.

In many instances, automated telephone response systems are inadequate to handle all of the caller's needs. This may be because the request is too complex to be adequately modeled as a series of menu steps, or the service may be of an occasional or unforeseen nature. In these instances, the provider may have made no provisions for such requests in the automated telephone response system. Also, the automated telephone response system may be unable to make sense of the caller's responses. Examples include entering account numbers in error or that do not exist on the company's account management system, or when the caller has a thick accent such that speech recognition software is unable to interpret the caller's responses. In these cases, it is common for automated telephone response systems to route the caller to a human operator to handle the call. In addition, the option to speak with a human operator is often provided within the menu choices, as a courtesy to callers who do not wish to navigate the automated telephone response system.

Businesses that employ automated telephone response systems experience many benefits in terms of improvements in productivity, quality of service and call volume. Because a caller can obtain a wide range of static information (e.g., hours of operation, location, etc.) and services (e.g., account balance, payments, etc.) from an automated telephone response system, the need for operators is reduced. Even when an operator is required, the automated telephone response system can off load the tasks associated with identifying the caller and other routine matters, so operators can spend more time answering questions and solving problems. Furthermore, because the automated telephone response system can effectively and efficiently route calls based upon the caller's needs, the operators can be more specialized in particular areas of interest, leading to higher quality assistance. Finally, because fewer calls actually require the assistance of an operator, the business can handle a larger volume of calls, and can extend the hours of operation of the call center.

One other advantage provided by the automated telephone response system is the inherent call load leveling function provided by the operator hold queue. Typically, when a caller requests an operator, the automated telephone response system places the caller on hold while it determines if an operator is presently available. When an operator becomes available, the caller who has been on hold the longest time is connected to that operator. Without this queuing function, a business has a choice: they can staff enough operators to handle the peak call volume but then have operators who are idle during off peak times or they can staff enough operator to handle some lower call volume and then have to turn away callers during the peak times. The operator hold queue permits the business to staff for the average call volume, with callers in the queue left to experience longer hold times during peak times.

While automated telephone response systems have been a great boon to the businesses that employ them, they have often been a source of frustration to the callers who experience them. Complaints typically focus on difficulty navigating the menus presented, particularly as it relates to getting to the human operator, and on waiting through the queue times. Successfully navigating an automated telephone response system often requires correctly selecting from up to ten menu items. In the first instance, this may lead to confusion because, by the time the message has listed the tenth option, the caller may have forgotten the correct number to push or say to get to their destination. Furthermore, the choices themselves may be confusing. The caller may not be sure whether to, for example, "press or say 2 for account balance" or "press or say 3 for account status", when what they wish to know their credit limit. Finally, a caller may inadvertently press the wrong number on their telephone, leading them down the wrong path. These problems are exacerbated when the automated telephone response system lacks adequate menu options to navigate back to the previous menu, leaving the caller no option but to hang up and try the call again.

In order to improve call center efficiency, businesses sometimes try to drive the caller to utilize the pre-recorded or dynamically produced information. This often takes the form of obscuring the menu selections necessary to speak with a human operator. Here the automated telephone response system may require excessive information from the caller, force the caller through several long information steps or otherwise make the caller attempt one or several services unsuccessfully before being given the option to speak with the operator. This often leaves callers frustrated and angry by the time they get to speak with the operator. Add to this a long wait in the operator hold queue (sometimes up to a half hour or more), and callers may simply give up in despair.

From the foregoing it will be apparent that there remains a need to improve the caller experience with automated telephone response systems while maintaining the productivity gains experienced by the businesses that employ them.

SUMMARY

Embodiments of the invention are herein presented by way of example and include a computerized method is provided for allowing a user to access a human operator in an automated telephone system having a plurality of subnets, wherein different subnets may have different designated human operators. The computerized method may comprise receiving a request for information from the user; identifying a subnet within the automated telephone system based on the request for information; using a telephone subnet crawler to navigate the subnet to reach a human operator pertinent to that subnet in the automated telephone system; and initiating a telephone call between the user and the human operator.

Further, a computerized method for allowing a user to access information in an automated telephone system having a plurality of nodes may comprise receiving search terms from the user to search for information from the automated telephone system; translating the search terms into a desired node in the automated telephone system; using a telephone subnet crawler to navigate to the desired node; and offering the user an option of fetching the requested information for the user or initiating a telephone call between the user and the desired node.

A system aspect includes a system for allowing a user to access a human operator in an automated telephone system having a plurality of subnets, wherein different subnets may have different designated human operators. The system may include an interface operable for requesting information from a user; a search module, connected to the interface, operable to receive the information, and to query a database for a subnet within the automated telephone system based on the information request; a telephone subnet crawler connected to the search module and operable to navigate the subnet to reach a human operator pertinent to that subnet in the automated telephone system; and a telephone module linked to the telephone subnet crawler and operable to initiate a telephone call between the user and the human operator.

By way of further example, a system for allowing a user to access information in an automated telephone system having a plurality of nodes may comprise an interface operable to receive a search term or terms from a user to search for information from an automated telephone system; a search module connected to the interface and operable to translate the search term into a desired node in the automated telephone system; and a telephone subnet crawler connected to the search module and the interface, and operable to navigate to the desired node, wherein the interface is further adapted to offer the user an option of fetching the information for the user or initiating a telephone call between the user and the desired node.

BRIEF DESCRIPTION OF DRAWINGS

Embodiments of the invention are described by way of example with reference to the accompanying drawings in which.

DETAILED DESCRIPTION OF EMBODIMENTS

Figure 1:
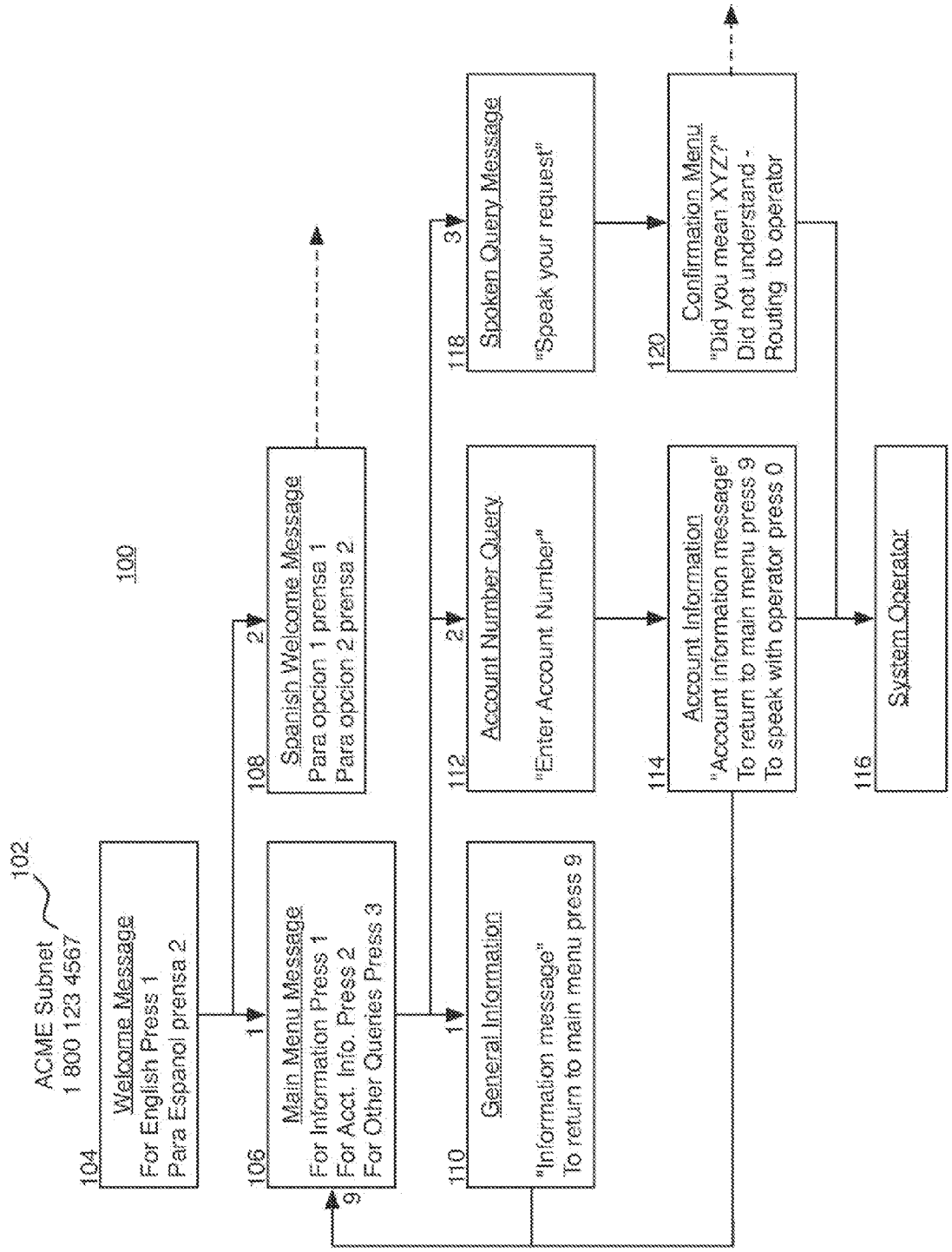
FIG. 1 is a diagram illustrating the structure and contents of a typical automated telephone response system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in this detailed description, it should be understood that any cited numerical range listed or described as being useful, suitable, or the like, should be considered to include any and every point within the range, including the end points. For example, "a range of from 1 to 10" is to be read as indicating each and every possible number along the continuum between about 1 and about 10. Thus, if any or all specific data points within the range, or conversely no data points within the range, are explicitly identified or referred to, it is to be understood that inventors appreciate and understand that any and all data points within the range are to be considered to have been specified, and that inventors convey possession of the entire range and all points within the range.

Introduction

The present disclosure views the interactive voice response system from the perspective of the caller and provides a quicker, easier and more satisfying experience without placing any additional burden on the businesses that employ interactive voice response systems. Using such advances in computer hardware and software capabilities as Voice Over Internet Protocol (VoIP), Speech to Text (STT), Text to Speech (STT) and language translation, the present disclosure shows an indexed data repository that contains the structure, content and information of a number of interactive voice response enabled telephone subnets, and a mechanism for indexing additional telephone subnets. The present disclosure also shows a system for granting callers access to the repository and quickly and effectively obtaining the services and information contained in the telephone subnets with less confusion and waste of time. As understood herein, an automated telephone response system includes Interactive Voice Response (IVR) systems, Automatic Call Distributors (ADC), Private Branch Exchanges (PBX), Voice Over IP (VoIP) systems, other computer/telephone technologies or hardware or software.

FIG. 1 shows the structure and contents of a typical automated telephone response system, shown generally as 100. The information contained on an automated telephone response system 100 is accessed through one or more telephone numbers registered to the business that employs the automated telephone response system 100, and navigating through the automated telephone response system by responding to a list of commands that guide the caller. The responses can be in analog or digital form. Analog responses consist of a caller pressing a dual-tone-multi-frequency (DTMF) key on a telephone keypad, or speaking the commands.

Upon dialing the registered subnet 102 (e.g. the subnet registered to the hypothetical ACME Company), a caller is greeted by a welcome message 104 and given the option to press "1" for further instructions in English or press "2" for Spanish. If "2" is selected by the caller, a Spanish welcome message is given 108 along with further options (not shown). If, on the other hand, the caller chooses "1", a main menu message 106 is given. Here, the three options are "1" for general information, "2" for account information or "3" other queries. Selecting "1" routes the caller to a pre-recorded information message 110 and the option to return to the main menu message 106. If, from the main menu message 106, the caller selects "2" for account information, she next hears an account number query message 112 where the caller can enter her account number. Upon entering the account number, the account information message 114 is dynamically created, telling the caller her account information, and the options, "9" to return to the main menu message 106, or "0" for the system operator 116 are presented. Upon choosing "0", the caller is connected at 116 with the system operator. Finally, if the caller selects "3" for other inquiries from the main menu message 106, she is routed to a spoken query message 118 where the caller is asked to speak a request. Upon speaking the request, a confirmation menu 120 is given, repeating the spoken request and asking the caller to confirm the request. If the request is correctly understood, the caller is routed to further messages disposing of her request (not shown). If the request cannot be understood, the caller is routed to the system operator 116. From this illustration, the automated telephone response system 100 can be seen as a tree of nodes, where each node contains the information and a set of options, which are the branches to the other nodes. Some of the nodes (e.g., the Spanish welcome message 108) are seen to grant access to other telephone subnets 102 (not shown). Other nodes (e.g., the account information message 114, or the confirmation menu 120) direct the caller to a human operator.

Telephone Subnet Crawler

Indexing of automated telephone response systems 100 consists of retrieving the information presented to callers through the automated telephone response system 100 in a way similar to that employed by web crawlers. A web crawler is used to index websites on the Internet, classify the information contained therein and place the information in a form that can be retrieved through web browsing or searching. A web crawler, or spider, is an automated script that systematically browses the World Wide Web creating copies of all web pages visited, and indexing the content of the web pages. A web crawler can begin with the list of registered domain names, published in the Domain Name System (DNS), and visit each site. There is no similar registry for automated telephone response systems 100: a telephone number listing, such as a telephone book, does not contain information as to whether or not a given telephone number is backed up by an automated telephone response system 100. However, there are still several ways to compile a list of the telephone numbers that identify an automated telephone response system enabled Telephone subnet, including manually entering numbers, adding references obtained from previously indexed Telephone subnets, harvesting Telephone numbers from the World Wide Web using classical web crawling techniques, and responding to user requests (i.e., providing on-demand services). With the exception of on-demand services, which will be discussed more fully below, the method of obtaining the telephone numbers associated with automated telephone response systems is not critical.

Figure 2:
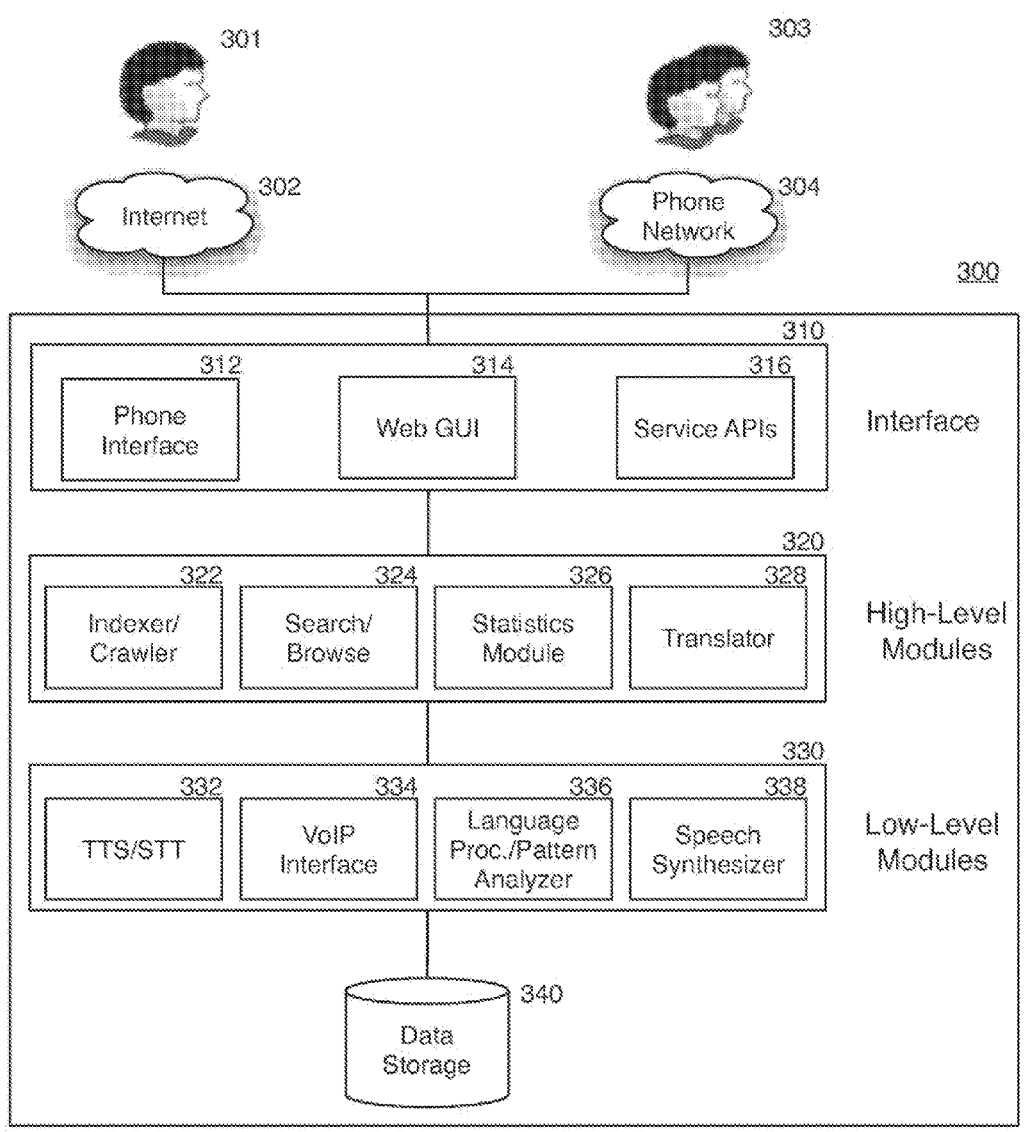
FIG. 2 is a schematic illustrating a computer system according to one embodiment of the present disclosure.

With a classical web crawler, once a page is visited, the web crawler will proceed to visit each web link found on the page, working its way down through each page until all pages in a domain are visited and indexed. There are many different crawling strategies, algorithms and policies that can be implemented in a web crawler to create the index. Similar strategies, algorithms and policies can be implemented in an automated telephone response system crawler. While it is not intended with this disclosure to discuss the details of how all such automated telephone response system crawlers could be implemented to create an index of interactive voice response system enabled automated telephone response systems 100, the following example is given to illustrate the general features and the types of information that can be gathered with an automated telephone response system crawler. A depth first traversal of a graph is described; with the additional capability of restarting the navigation of the automated telephone response system 100 because such systems often do not permit navigation back upward. As such, the crawler has to be able to restart at the root to traverse unvisited branches. Also note that any intelligent agent can act as the automated telephone response system crawler described. An example of such an intelligent agent is shown in FIG. 2, where a computer system is shown generally as 300.

The computer system 300 connects to the Internet 302 and to the telephone network 304 through the interface layer 310. The interface layer 310 includes a telephone interface 312 with dual-tone-multi-frequency (DTMF) dialing and sound capability, a web graphical user interface (GUI) 314, and service application programming interfaces (APIs) 316. Connected to the interface layer 310 is a set of high-level modules 320 that include the telephone subnet crawler/indexer software 322, a search/browse module 324, a statistics module 326 and a translator module 328. Underlying the high-level modules 320 is a set of low-level modules 330, including a Text-to-Speech/Speech-to-Text (TTS/STT) module 332, Voice-Over-Internet APIs 334, a natural language processing/pattern analyzer 336, and a speech synthesizer 338. Finally, the computer system 300 has data storage 340. Users 301, in this example, access the computer system 300 through the Internet 302. Operators 303 associated with the automated telephone response system 100 are accessed through the telephone network 304 in this example. These access points are illustrative, and not meant to limit the scope of the present disclosure.

Figure 3:
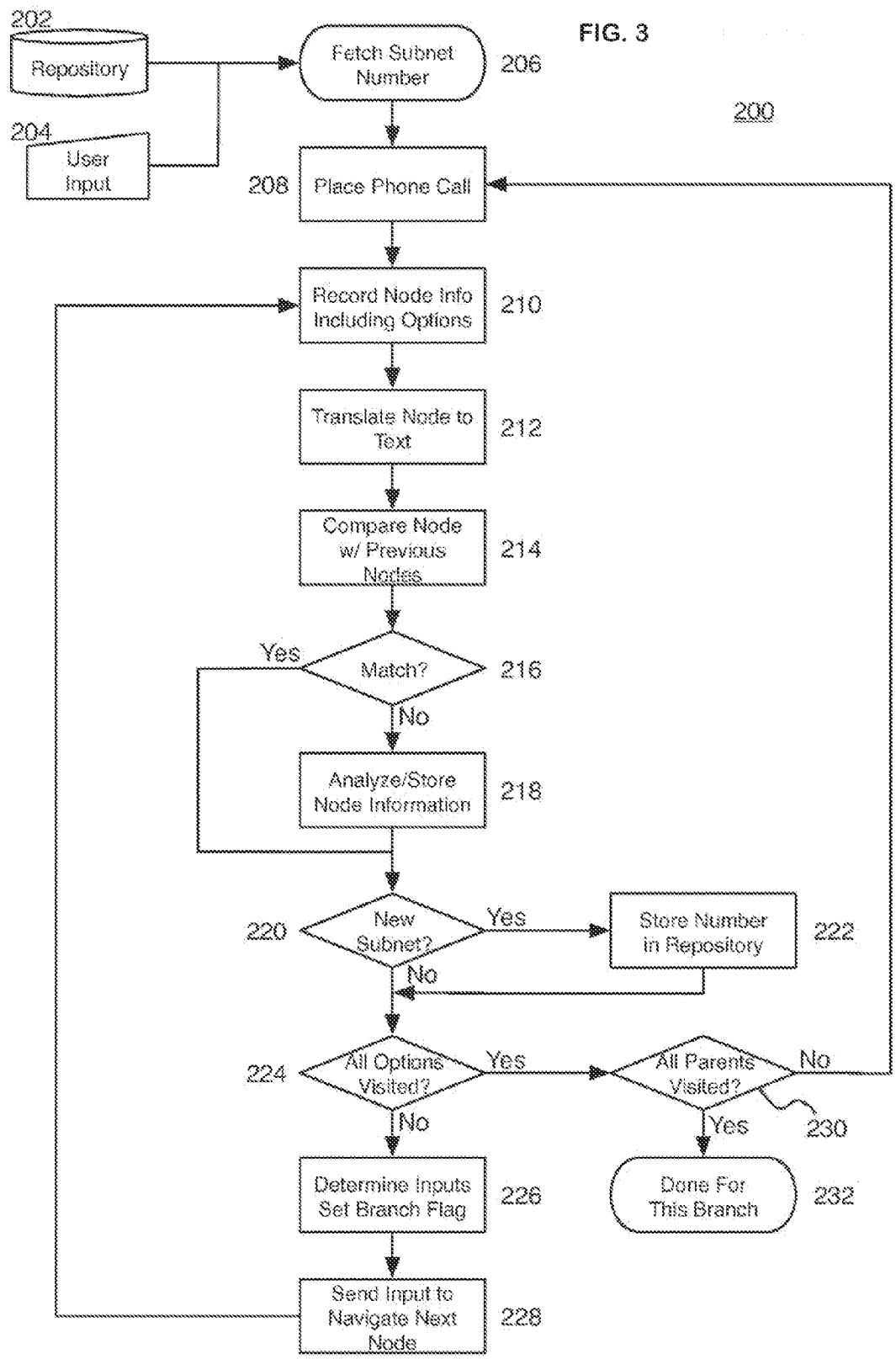
FIG. 3 is a flowchart illustrating Telephone subnet crawler/indexer software according to one embodiment of the present disclosure.

As illustrated in the flowchart of FIG. 3, the telephone subnet crawler/indexer software 322 fetches at 206 the telephone number of an automated telephone response system 100 from a repository 202 (i.e., a data structure on the data storage 340) or from user input 204 (e.g., from "on-demand" requests), and calls at 208 the telephone number on the telephone network 304 with the telephone interface 312. When the automated telephone response system 100 answers the call, the system records at 210 the node information in the data storage 340 (as, for example in a .wav, .mp3 or other audio file). The telephone subnet crawler/indexer software 322 next translates the node information at 212 into text using the TTS/STT module 332. At this point, other functions can be performed on the node information, such as hashing the message to speed later comparisons. Next, the telephone subnet crawler/indexer software 322 compares at 214 the current node information with the information from previously visited nodes and determines at 216 if the present node has been visited before. Methods for comparison include comparing the hash for exact matches, or performing vector matching to find approximate matches to account for minor differences resulting from telephone line noise. If, at 216, the node has never been visited before the telephone subnet crawler/indexer software 322 performs at 218 an analysis of the node information and a translation into a software recognized format. As such, the natural language processing/pattern analyzer module 336 identifies patterns in the textual information (as, for example, "hours of operation", "press 'x'", or the list of options), and composes a list of allowed and expected inputs. Here, the software should recognize that, for example, "For English, press 1" is the functional equivalent of "Press 1 for English", and that both messages mean that sending a DTMF "1" through the telephone interface 312 is a valid option to navigate the automated telephone response system 100. Additionally, the software should recognize, e.g., that "If you are a provider, please say 'Provider' is to be understood to mean that the word "Provider" can be formed by the speech synthesizer 338 and sent through the telephone interface 312 to navigate the automated telephone response system 100. In this way, a database is created that captures the information content and structure of the automated telephone response system 100. One additional function performed at 218 in the analysis of the node information is to create a branch map that identifies all possible branch options for the node and a branch visited flag for each branch that identifies whether or not the crawler has visited that branch. Each flag is initially set to "unvisited". If at 220 another automated telephone response system 100 number is detected, the newly found automated telephone response system 100 number is recorded at 222 into the repository 202 with an appropriate indicator that indexing of the associated automated telephone response system 100 is required. This processing is often performed asynchronously; to permit complete traversal of the original automated telephone response system 100 before initiating indexing of other such systems.

If either at 216 the node has been visited before, or at 220 no other automated telephone response system 100 number is detected, or at 222 a newly found telephone subnet 102 number is recorded into the repository 202, the branch visited flags for the current node are checked at 224. If there are unvisited branches, the telephone subnet crawler/indexer software 322 selects the first unvisited branch at 226 and determines the expected input necessary to navigate to that branch. The telephone subnet crawler/indexer software 322 next sends at 228 the input necessary to navigate to the first unvisited branch through the telephone interface 312 to the automated telephone response system 100, and processing proceeds at 210, where the system records the new node information and processing for that node continues as described. If at 224, all branches from the present node have been visited, the telephone subnet indexer/crawler software 322 determines at 230 if all branches in all parent nodes have been visited, and if so, the call is terminated at 232, and all further processing on the present automated telephone response system 100 is halted. If, at 230, all branches in all parent notes have not been visited, the call is terminated and the automated telephone response system 100 is redialed at 208, where the telephone subnet crawler/indexer software 322 begins to traverse the subnet again, until all branches are indexed.

User Interface

Once a telephone book of automated telephone response systems 100 has been built, and the content and structure indexed, a user interface can be built to permit easy navigation of the automated telephone response systems 100. A user interface permits a user 301 to browse the information or search for the specific automated telephone response system 100 associated with a business of interest to the user 301. While the computer system 300 includes a web graphical user interface (GUI) 314, the user interface herein disclosed is not limited to residing on the same computer as the telephone subnet crawler/indexer software 322 and date storage 340. In several embodiments of the present disclosure, the user interface is an audio interface (i.e., an interactive voice response system), a web interface, and a mobile device interface, among others.

Figure 4:
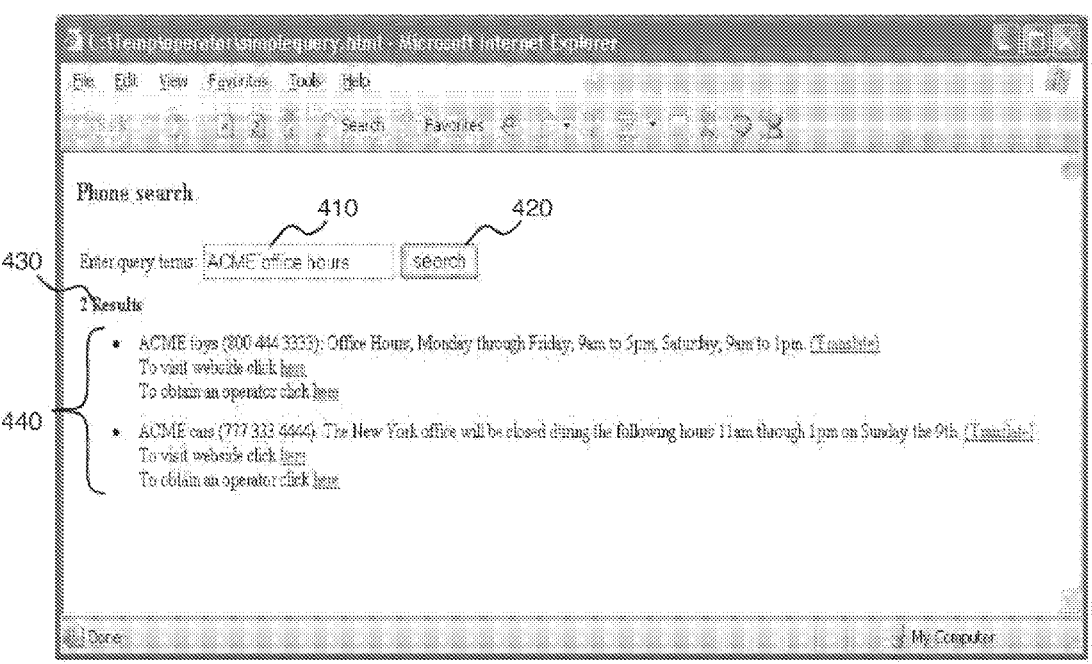
FIG. 4 is a screen capture illustrating the web graphical user interface according to one embodiment of the present disclosure.

The simplest way for a user 301 to interact with the system is to request for the information from a given node. This is accomplished via explicit querying of the database. As an example, the user 301 may enter a string, such as "(800) 123-4567/1 (English)/1 (General Information)", and expect to hear a playback of the general information message 110. This model works if the user 301 knows in advance the desired branch path, and is comparable to entering a URL in a web browser. A more complex interaction involves implicit querying, using information associated with an automated telephone response system 100 and its nodes. Here, keywords can be entered into a search engine, and the web GUI 314 returns the results, in a fashion akin to a web search engine. FIG. 4 shows a capture 400 from a web (GUI) 314, where the user 301 has entered the query terms 410 "ACME office hours", and initiated the search by clicking on the "Search" button 420. In this hypothetical situation, two results 430 were returned, one each associated with the office hours for "ACME Toys" and for "ACME Cars". Here, the user 301 is left to determine which "ACME" she is looking for. As an additional mater, it should be noted that other relevant information can be displayed with the results 440, such as links to each business' website, or access to the human operator. Note, however, that in both of the above situations, the information resides in the database, and there is no need to actually call the automated telephone response system 100 for the user 301 to obtain the information she seeks.

Figure 5:
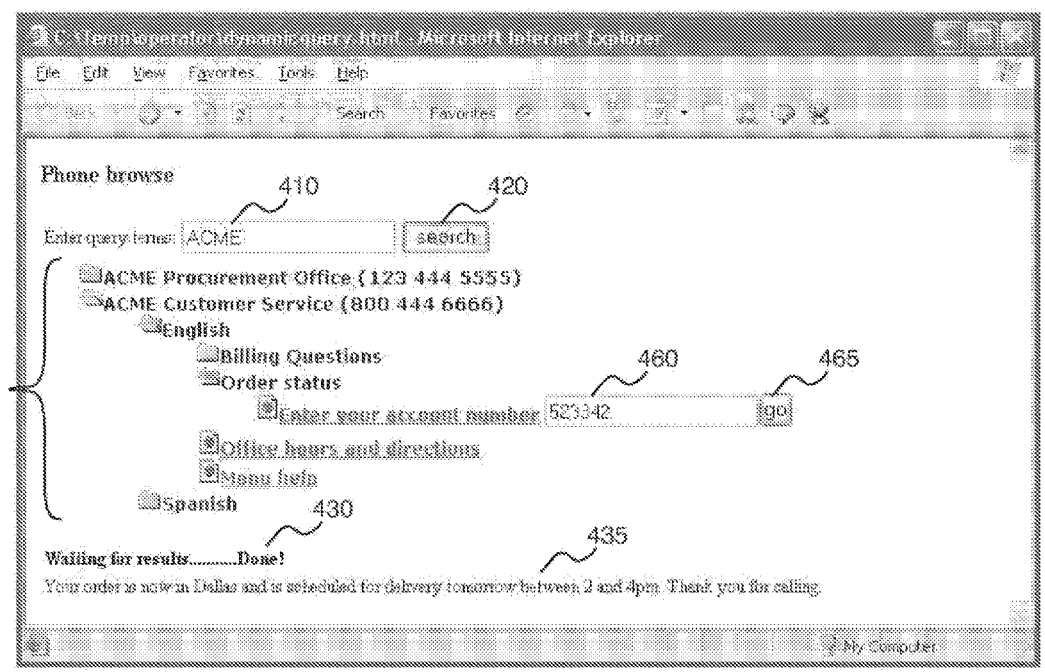
FIG. 5 is another example of another screen capture from the web graphical user interface according to one embodiment of the present disclosure.

As noted above, it is also possible with interactive voice response systems to provide input to the automated telephone response system 100 and thereby obtain dynamically created information. In such situations, it is not possible to obtain the information the user 301 seeks without making a telephone call to the automated telephone response system 100. However, it is still possible for the web GUI 314 to mediate the transaction, and obtain the information for the user 301. FIG. 5 is another example screen capture 400 from the web (GUI) 314, where the user 301 has entered the query term 410 "ACME", and initiated the search by clicking on the "Search" button 420. Here, because no specific search term beyond the company name has been provided, the web GUI 314 returned a clickable list of available services within the automated telephone response system 100. The user 301 has selected a set of menu items 450 corresponding with the nodes within the automated telephone response system 100, here: "ACME Customer Service", "English" and "Order Status". This sequence was identified as requiring the user 301 to input into an input field 460 to proceed farther. The user 301 thereupon enters the appropriate account information, "543342", and clicks on the "Go" button 465. The immediate result 430 is a hold message. At this point, the web GUI 314 directs the telephone interface 312 to call the automated telephone response system 100, navigate to the "Account Number" node, input the user's 301 account number as entered in the input field 460 and record the response from the automated telephone response system 100. When the automated telephone response system 100 responds, the web GUI 314 directs the TTS/STT module 332 to interpret the response, and displays the information as the final response 435, with package location and the expected delivery time. As an alternative (not shown), the web GUI 314 could give the user 301 the option to hear the information as recorded (e.g., by playing a .wav, .mp3 or other audio file). Note here that, while the computer system 300 hosts an interaction requiring a call to the automated telephone response system 100, the user 301 is freed from navigating the interactive voice response system, and in particular, she does not have to wait on the telephone for the requested information.

Figure 6:
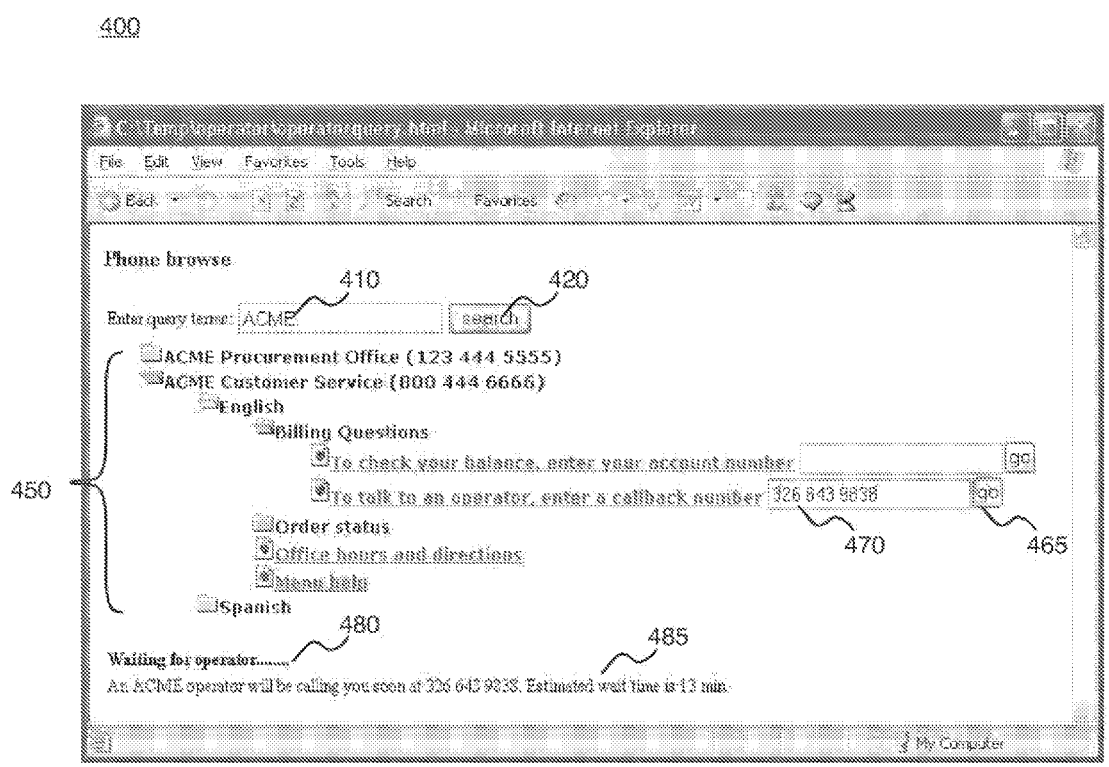
FIG. 6 is another example of a screen capture from the web graphical user interface according to one embodiment of the present disclosure.

In another type of interaction, the user 301 may desire to speak directly with a human operator 303. This may be because the desired information is not available on the interactive voice response system of the automated telephone response system 100, or because the user 301 needs to carry out a transaction that is too complex to be handled without the human operator 303. FIG. 6 is an example of a screen capture 400 from the web (GUI) 314, where the user 301 has entered the query term 410 "ACME", and initiated the search by clicking on the "Search" button 420. Again, the user 301 has selected a set of menu items 450 corresponding with the nodes within the automated telephone response system 100. Here the user 301 has accessed "ACME Customer Service", "English" and "Billing Questions". This sequence resulted in the display of a callback number input field 470. When the user 301 enters their Telephone number, "326 643 9838", and clicks on the "Go" button 465, the immediate result 480 is a waiting for operator message. At this point, the web GUI 314 directs the telephone interface 312 to call the automated telephone response system 100, navigate to the "Operator" node, and wait on hold until the operator 303 comes on the line. Here, in a simple mode, when the operator 303 comes on the line, the computer system 300 calls the user 301 at the number provided in the callback number input field 470 and conferences the user 301 in with the operator 303. In one embodiment of the present disclosure, the computer system 300 plays an introductory message to the operator 303 such as a user specific recording or information necessary for the call (e.g., user information, account number, etc.) to mitigate delays in conferencing the user 301 and the operator 303 together. Here, again, the user 301 is free to pursue other tasks while the computer system 300 handles the navigation of the automated telephone response system 100, and the wait time for the operator 303.

Figure 7:
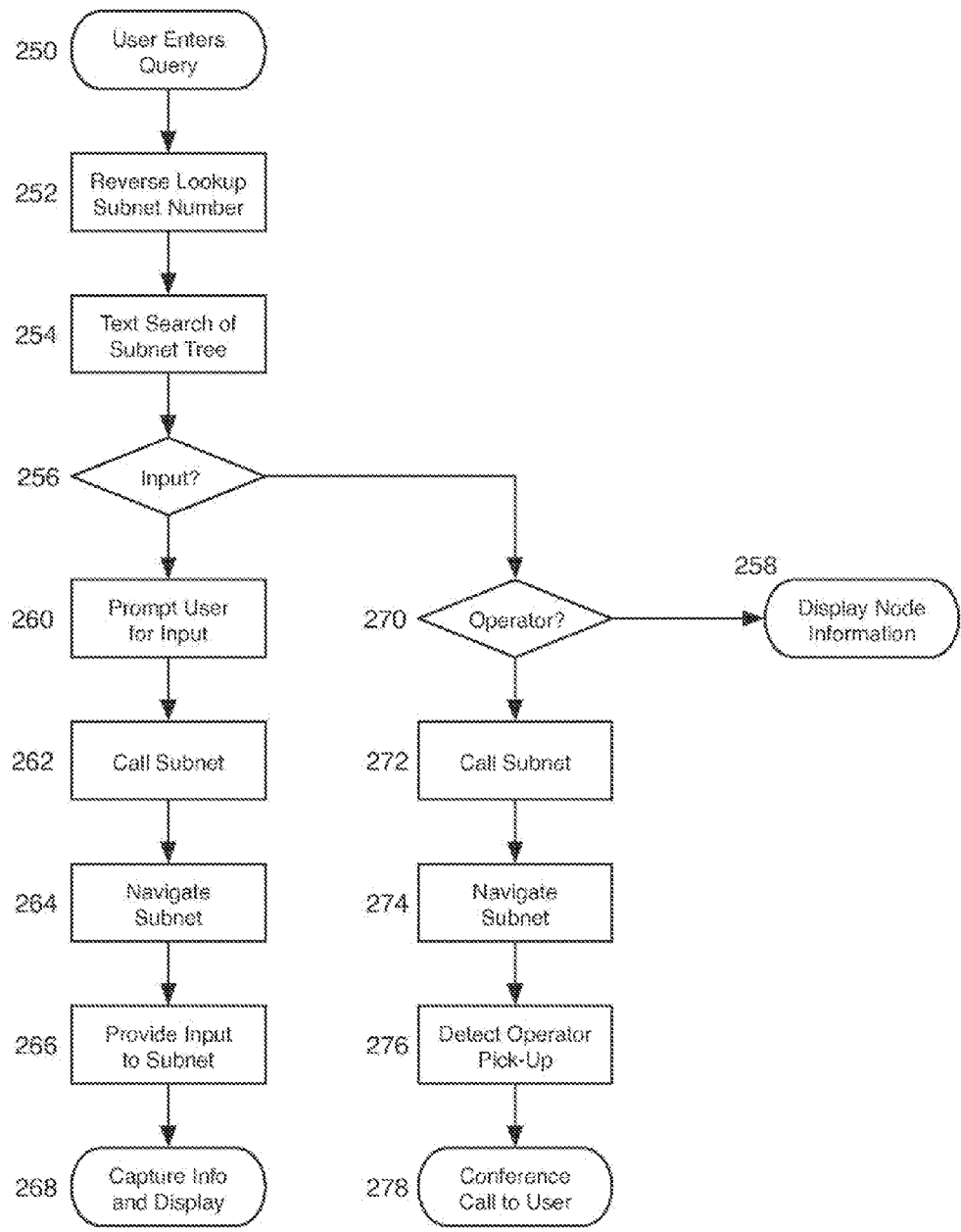
FIG. 7 is a flowchart illustrating the functions embodied in FIGS. 4-6 according to one embodiment of the present disclosure.

The function of the previous examples can be generalized, as illustrated in the flowchart shown in FIG. 7. The user 301 enters the query into the query field 250, and the web GUI 314 directs at 252 the search/browse module 324 to perform a reverse lookup on the search term to find the telephone subnet 102 number that is the subject of the user's 301 query. Upon finding the relevant subnet, the web GUI 314 further directs at 254 the search/browse module 324 to perform a full text search of subnet tree for nodes that contain the search terms. The web GUI 314 determines at 256 if the nodes found require input from the user 301. If the nodes found require input from the user 301, the web GUI 314 prompts at 260 the user 301 for the appropriate input in the input field 460. The web GUI 314 then directs at 262 the telephone interface 312 to call the relevant automated telephone response system 100, navigate at 264 to the selected node, and submit at 266 the user input. Upon receipt at 268 of the dynamic information, the web GUI 314 presents the final response 435 to the user 301. If at 256 any of the nodes found do not require input from the user 301, the web GUI 314 determines at 270 if a request is for a human operator 303. If not, the information found in the node is returned at 258 to the web GUI 314 and displayed to the user 301 in the results field 430. If at 270 the request is for a human operator 303, the web GUI 314 directs at 272 the telephone interface 312 to call the relevant automated telephone response system 100, navigate at 274 to the selected node, and wait for the operator 303 to come on the line at 276. When, at 276 the operator 303 is detected, the web GUI 314 directs at 278 the telephone interface 312 to dial the user 301 at the number the user input into the callback number input field 470, and conference the user 301 and the operator 303 together.

In another embodiment, the computer system 300 directs the natural language processing/pattern analyzer 336 to detect when an operator 303 is about to come on the line, and calling the user 301 at the number provided in the callback number input field 470 shortly before the operator 303 comes on the line. This minimizes the likelihood that the operator 303, upon receiving a call instituted by the computer system, and finding no person on the line, simply hangs up the call in favor of their next incoming call. This functionality can be implemented by the detection of standard greetings that immediately precede the operator's 303 appearance on the line (e.g., standard boilerplate language like "this call may be monitored for quality purposes").

In an additional embodiment, the computer system 300 includes a statistical module 326 that tracks the wait times for operators 303 on each requested automated telephone response system 100 so as to provide the user 301 with an estimated wait time 485 until the next operator 303 becomes available. Such a statistical module 326 can take into account such variables as time of day, day of the week or month, or, if other users have requested an operator 303 from the same automated telephone response system 100 recently, the wait time experienced by the other users 301. In another embodiment, the estimated wait time can be provided to the user 301 before they decide to call the operator.

In one embodiment, called the "on-demand" service, when a user 301 wishes to access the automated telephone response system 100 of a business that has not previously been indexed, hence, there is not data available on the information, content or structure of the automated telephone response system 100, and so the web GUI 314 is unable to parse the database to satisfy the user's 301 query. In this case, the web GUI 314 directs the telephone subnet crawler/indexer 322 to crawl the automated telephone response system 100, and index the information, content and structure so that future requests for access to that business' automated telephone response system 100 can be satisfied in the normal manner. In addition, the web GUI 314 can instruct the user 301 to return at a later time to make their query. In implementation, this amounts to the user input 204 shown in FIG. 3.

In many cases, it is standard practice for a business that employs an automated telephone response system 100 to record the calls that get handled by the operators 303. Ostensibly, the recordings are for training purposes. However, another unstated purpose is to have an accurate record of the transaction for legal reasons. This is a luxury afforded to the business that has typically been unavailable to the caller because of the need to attach cumbersome equipment to telephone lines, and the necessity to inform a party that their conversations are recorded. In one embodiment of the present disclosure, the web GUI 312 gives the user 301 the option to maintain a recording of the call when she is connected with the operator 303. This can be done by providing the user 301 with a .wav, .mp3 or other audio file of the conversation with the operator 303.

In another embodiment of the present invention, a software or hardware based text to text language translators 328 is employed to give users 301 who speak foreign languages not supported by a business' automated telephone response system 100 greater access to the information and content therein. Here, the user 301 enters their preferred language into the web GUI 314. The web GUI 314 then provides all search and query screens 400 to the user 301 in their preferred language. Then, when the user 301 enters their query into the query field 410, the language translator 328 translates the query into the language of the database it is created in. The search can then take place normally. When the search is completed, the language translator 328 translates the retrieved information into the user's 301 preferred language.

Figure 8:
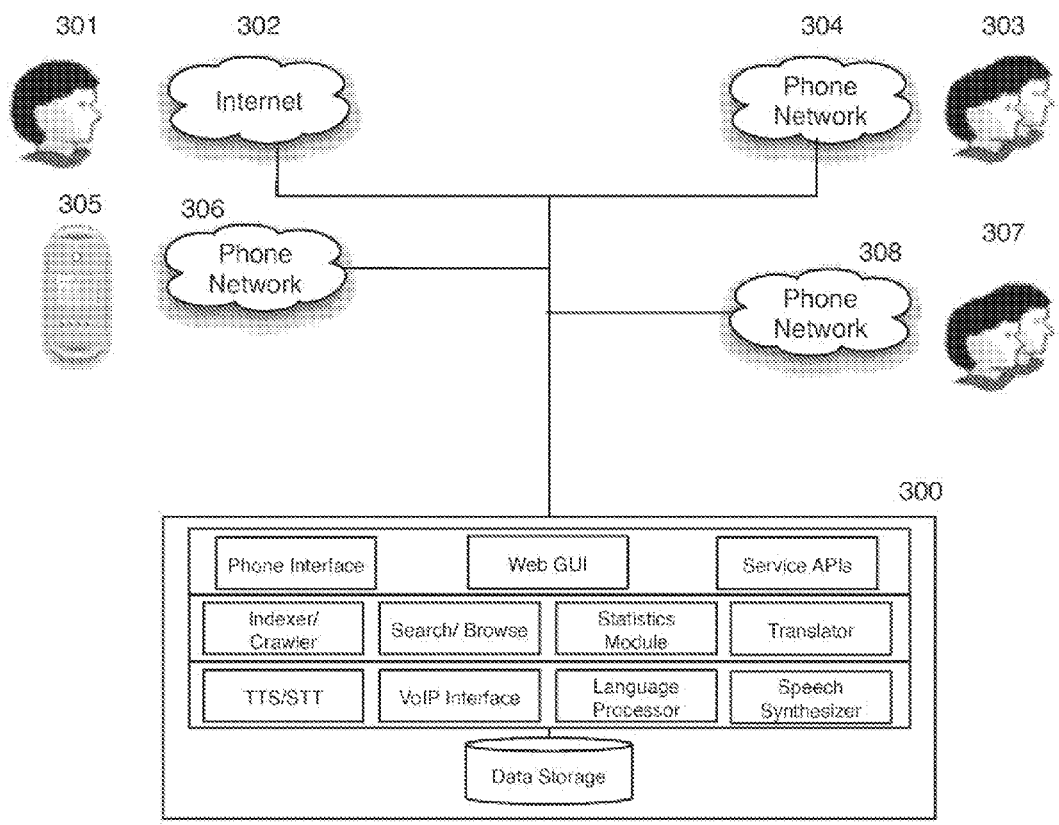
FIG. 8 is a schematic illustrating another embodiment of a computer system.

A practical example is illustrated in FIG. 8. Here, the user 301 accesses the web GUI 314 from their home Internet connection 302. She enters a request to speak with the operator 303 on the ACME automated telephone response system 100. The web GUI 314, with data from the statistics module 326, informs the user 301 that the current wait time to speak with an ACME operator 303 is 45 minutes. Deeming it important enough to speak with the operator 303 as soon as possible, the user 301 enters the number for her mobile telephone 305 in the callback number input field 470 and logs off of her home Internet connection 302. The web GUI 314 calls the ACME automated telephone response system 100 over a telephone line 304, navigates to the system operator node 116 and waits until it detects the operator 303. During this time, the user 301 has left her home with her mobile telephone 305. When the operator 303 comes on the line, the web GUT 314 plays an introduction message to the operator 303 while simultaneously calling the user's mobile telephone 305 over a second telephone line 306 and conferences the operator 303, and the user 301 together.

In another embodiment of the present invention, the web GUI 314 presents the user 301 with the option to speak with more than one operator 303 and 307 on separate automated telephone response systems 100 on telephone subnets 304 and 308. A common example is found when a patient needs to coordinate medical billing information with insurance payment information. In such situations, it is convenient for the patient to speak with representatives from both the medical service provider and the insurance company at the same time. However, if both the medical service provider and the insurance company have automated telephone response systems 100, the patient typically cannot get both representatives on the telephone at the same time. Here, the patient (user) 301 places a request for simultaneous contact with operators 303 and 307 on the web GUI 314 and leaves her mobile telephone 305 number in the callback number input field 470. The web GUI 314 gets the expected wait times for each operator 303 and 307 from the statistics module 326, places the call to the one with the longest wait time (307 for this example), and waits for the operator 307 to come on the line 308. The web GUI 314 will also call the second operator 303 when the expected wait time equals that of the first operator 307. When both operators 303 and 307 are on their respective lines 304 and 308, the web GUI calls the user's 301 mobile telephone 305 and conferences all three lines 304, 306 and 308 together.

While a single computer system 300 has been used to illustrate the functionality of the telephone subnet crawler 322 and user interface 314, it is not necessary to the spirit of the present disclosure that all components reside on the same computer system 300. The individual modules and functions may be divided among several separate computers. In the extreme, a separate computer may perform each module and function. However, common approaches include separate computers such as a database server, a user hosting/interface computer and telephone exchange/VoIP computers.

From the foregoing it will be appreciated that a telephone subnet indexer/crawler can create a useful database that contains the information, content and structure of automated telephone response systems and that a user interface that access the database and has the ability to navigate automated telephone response systems will create an enhances user experience.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about A to about B," or, equivalently, "from approximately A to B," or, equivalently, "from approximately A-B") disclosed herein is to be understood as referring to the power set (the set of all subsets) of the respective range of values. Accordingly, the protection sought herein is as set forth in the claims below.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

That which is claimed is:

1. A computerized system for indexing a telephone subnet having a plurality of nodes, the computerized system comprising:
an interface layer configured for network communication;
a high-level module in communication with the interface layer, the high-level module comprising at least one of a telephone indexer and a telephone subnet crawler;
a low-level module in communication with and underlying the high-level module, the low-level module comprising at least one of a text-to-speech module, a speech-to-text module, a Voice over Internet Protocol (VoIP) interface, a language processor, a pattern analyzer, and a speech synthesizer; and
a data storage device in communication with the low-level module, the data storage device configured to store node information.

2. The computerized system of claim 1, wherein the interface layer is configured to be in connection with the Internet.

3. The computerized system of claim 2, wherein the interface layer is configured to be in connection with a telephone network.

4. The computerized system of claim 1, wherein the speech-to-text module is configured to translate node information into text.

5. The computerized system of claim 4, further comprising a hashing module configured to hash the text corresponding to a node.

6. The computerized system of claim 1, wherein the interface layer further comprises an application programming interface.

7. A computerized method for accessing an operator in a subnet node, the computerized method comprising:
receiving a query from a user;
obtaining a callback number for the user;
using a computerized telephone subnet crawler to navigate to the subnet node;
identifying that the operator is on a line; and
initiating a computerized telephone callback to the user for connecting the operator to the user.

8. The computerized method of claim 7, further providing user information to the operator prior to connecting the operator to the user.

9. The computerized method of claim 7, further translating the query into text.

10. The computerized method of claim 9, further identifying the subnet node based on the text.

11. The computerized method of claim 10, further performing a search for the text in the nodes of the subnet.

12. The computerized method of claim 7, further detecting when the operator is about to come on the line.

13. The computerized method of claim 12, wherein the detection is based on at least one of pattern analysis and natural language processing.

14. The computerized method of claim 13, further detecting standard greeting.

15. A computerized method for allowing a user to access a node in a telephone subnet, the computerized method comprising:
receiving a search query from the user through a web interface;
performing a lookup on the search query to identify a telephone subnet, the telephone subnet having a plurality of nodes;
performing a search of the telephone subnet for nodes that correspond to the search query and selecting a node;
calling the subnet and navigating to the selected node using a telephone subnet crawler, the telephone subnet crawler using at least one of a DTMF and speech to navigate the telephone subnet for creating and storing a data structure representative of a plurality of telephone subnets; and creating a user interface from the date structure to allow the user to navigate locations in at least one of plurality of telephone subnets.

16. The computerized method of claim 15, further determining if the selected node requires input from the user.

17. The computerized method of claim 16, further prompting the user for the user input and submitting the user input to the telephone subnet.

18. The computerized method of claim 17, further conferencing the user in with an operator of the node.

19. The computerized method of claim 15, further conferencing the user in with an operator of the node.

20. The computerized method of claim 15, wherein more than one node is identified, the method further comprising navigating to the more than one node, and conferencing the user in with operators of the more than one node.

\* \* \* \* \*